United States Patent
Huster

(10) Patent No.: US 6,889,650 B2
(45) Date of Patent: May 10, 2005

(54) INTERNAL-COMBUSTION ENGINE HAVING BALANCING SHAFTS

(75) Inventor: Joachim Huster, Friedrichshafen (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 0 days.

(21) Appl. No.: 10/777,177

(22) Filed: Feb. 13, 2004

(65) Prior Publication Data

US 2004/0159301 A1 Aug. 19, 2004

(30) Foreign Application Priority Data

Feb. 14, 2003 (DE) .......................... 103 06 152

(51) Int. Cl.⁷ ................................ F02B 75/06
(52) U.S. Cl. ........................ 123/192.2; 123/54.4
(58) Field of Search ................. 123/192.2, 54.4

(56) References Cited

U.S. PATENT DOCUMENTS 4,028,963 A * 6/1977 Nakamura et al. ............ 74/604
4,683,849 A * 8/1987 Brown ..................... 123/192.2
5,657,728 A * 8/1997 Diggs ...................... 123/192.2
6,253,725 B1 7/2001 Groddeck et al. ...... 123/195 R
2003/0000495 A1 1/2003 Groddeck et al. ...... 123/195 R

FOREIGN PATENT DOCUMENTS

| DE | 42 38 148 | 5/1994 | |
| DE | 198 55 562 | 5/2000 | |
| DE | 100 33 416 | 6/2001 | |
| JP | 06213278 A | * 8/1994 | ............ F16F/15/26 |

* cited by examiner

Primary Examiner—Noah P. Kamen
(74) Attorney, Agent, or Firm—Crowell & Moring LLP

(57) ABSTRACT

A first balancing shaft and a second balancing shaft are provided for an internal-combustion engine having four cylinders in a V-arrangement. The free inertial forces of the second order are reduced by way of the balancing shafts. The second balancing shaft is arranged in the point of intersection of the cylinder Vs above the crankshaft. The rotation center points of the two balancing shafts and of the crankshaft are situated on a perpendicular axis of symmetry which extends through the point of intersection.

22 Claims, 2 Drawing Sheets

INTERNAL-COMBUSTION ENGINE HAVING BALANCING SHAFTS

BACKGROUND AND SUMMARY OF THE INVENTION

This application claims the priority of Application No. 103 06 152.5 filed in Germany on Feb. 14, 2003, the disclosure of which is expressly incorporated by reference herein.

The invention relates to an internal-combustion engine having balancing shafts. Preferred embodiments relate to engines having four cylinders in a V-arrangement, a crankshaft, and a first balancing shaft parallel to and below the crankshaft for reducing the free inertial forces of the second order.

An internal-combustion engine in a V-arrangement is known from German Patent Document DE 42 38 148 A1. A balancing shaft is provided for reducing the free inertial forces of the second order. In the further text, this is called the first balancing shaft. The first balancing shaft extends below the crankshaft parallel thereto. This first balancing shaft is driven by way of a chain drive, a planetary gear being provided for reversing the rotating direction.

The first balancing shaft contributes to the smooth running of the internal-combustion engine. However, it is problematic that, as a result of the spatial position of the first balancing shaft—laterally offset with respect to the crankshaft—, the free inertial forces of the second order are not completely eliminated.

It is therefore an object of the invention to construct an internal-combustion engine with four cylinders in the V-arrangement, in the case of which the free inertial forces of the second degree are completely eliminated.

This object is achieved according to certain preferred embodiments of the invention by providing an internal-combustion engine having four cylinders in a V-arrangement, having a crankshaft and having a first balancing shaft for reducing the free inertial forces of the second order which is arranged below and parallel to the crankshaft, wherein a second balancing shaft is provided in a point of intersection of the cylinder Vs above the crankshaft, and wherein the rotation center points of the first balancing shaft, of the second balancing shaft and of the crankshaft are situated on a perpendicular axis of symmetry which extends through the point of intersection.

Further advantageous features of preferred embodiments of the invention are described herein and in the claims.

The invention provides a second balancing shaft which is arranged in the point of intersection of the cylinder-Vs above the crankshaft. Here, the rotation center points of the first balancing shaft, of the second balancing shaft and of the crankshaft are situated on a perpendicular axis of symmetry which extends through the point of intersection. In other words: The first balancing shaft is situated precisely below the crankshaft, and the second balancing shaft is situated precisely above the crankshaft.

In a further development of the invention, it is provided that the second balancing shaft is provided with a main lubricant duct. It is known that, in the case of an internal-combustion engine in a V-arrangement the main lubricant duct is situated in the cylinder V. By way of this main lubricant duct, the main bearings of the crankshaft and the spraying nozzles for the piston cooling are supplied with lubricant. In the case of this embodiment, the second balancing shaft additionally takes over the function of the main lubricant duct. For this purpose, the second balancing shaft has a lubricant feeding device, a guiding duct in the interior, outlet openings for the removal of the lubricant and eccentric weights.

In a further development, the second balancing shaft has partial milled-out sections on the circumference. A tube is arranged in the interior as a guiding duct.

As a result of the ideal position of the two balancing shafts, the free inertial forces of the second order are completely eliminated. Since the second balancing shaft additionally takes over the function of the main lubricant duct, no additional space is required. The weight increase in comparison to the internal-combustion engine known from the state of the art is moderate.

Other objects, advantages and novel features of the present invention will become apparent from the following detailed description of the invention when considered in conjunction with the accompanying drawings.

DETAILED DESCRIPTION OF THE DRAWINGS

Figure 1:
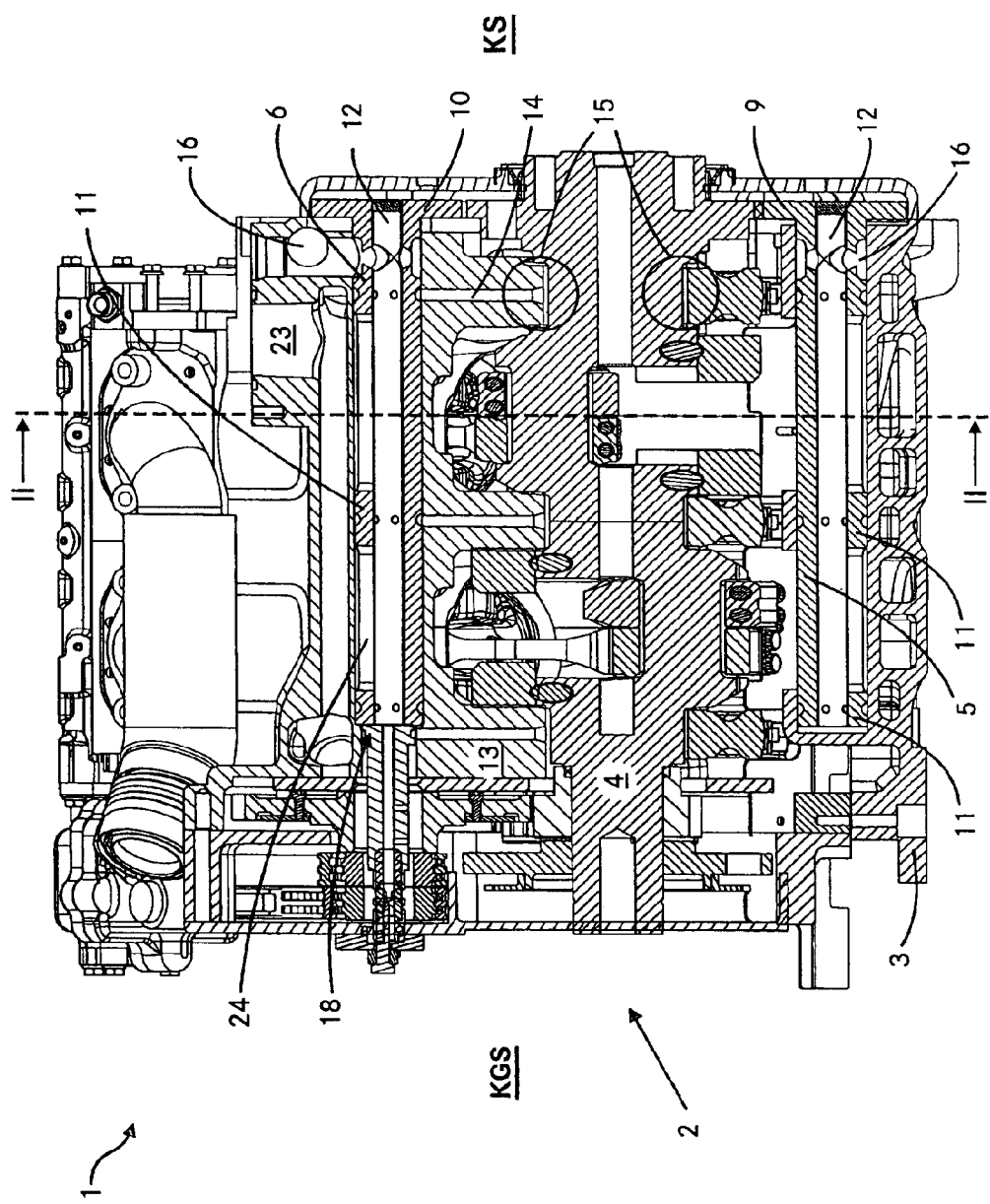
FIG. 1 is a longitudinal sectional view of the an internal-combustion engine, constructed according to a preferred embodiment of the present invention.

FIG. 1 illustrates an internal-combustion engine 1 with four cylinders in a V-arrangement. Among other devices, a crankshaft 4, a first balancing shaft 5, a second balancing shaft 6, and a venting channel 23 are situated inside the crankcase 2. With respect to the environment, the crankcase 2 is closed off on the bottom side by means of a cover plate 3. Such a cover plate 3 is known, for example, from German Patent Document DE 100 33 416 C1 (corresponding U.S. published application US2003000495). The output of the internal-combustion engine 1 takes place on the power output side KS, shown on the right side of the drawing. The wheel drive is situated on the opposite side, thus the side KGS opposite the power side KS.

The first balancing shaft 5 is arranged below the crankshaft 4, and the second balancing shaft 6 is arranged above the crankshaft 4. The precise geometrical position of the two balancing shafts is explained in conjunction with FIG. 2. By way of a power wheel 9, the first balancing shaft 5 is driven directly by the crankshaft 4. The first balancing shaft 5 rotates at twice the rotational speed against the rotating direction of the crankshaft 4. The second balancing shaft 6 is driven by way of a power wheel 10 indirectly by the crankshaft 4 by means of an idler gear. The second balancing shaft 6 also rotates at twice the rotational speed of the crankshaft 4 in the same rotating direction as the latter. The second balancing shaft 6 is arranged in a main lubricant duct 18. It takes over the function of the main lubricant duct 18. For this purpose, the second balancing shaft 6 has a radial lubricant feeding device 16 for feeding the lubricant. In the interior of the second balancing shaft 6, the lubricant is guided through a tube 12. On its outer circumference, the tube 12 has bores through which the lubricant can enter into the feeding ducts 14. The feeding ducts 14 are arranged in partitions 13 of the crankcase 2. By way of these feeding ducts 14, the lubricant reaches the main bearings 25 and the spraying nozzles 17. By way of the main bearings 15, the crankshaft 4 is supported on the crankcase 2. The spraying nozzles 17 are used for the piston cooling; see FIG. 2. The eccentric weights 11 of the second balancing shaft 6 are produced by partial milled-out sections 24. The first balancing shaft 5 is constructed analogous to the second balancing shaft 6. The lubricant fed to the first balancing shaft 5 is used exclusively for the lubrication of the bearings of the first balancing shaft 5.

Figure 2:
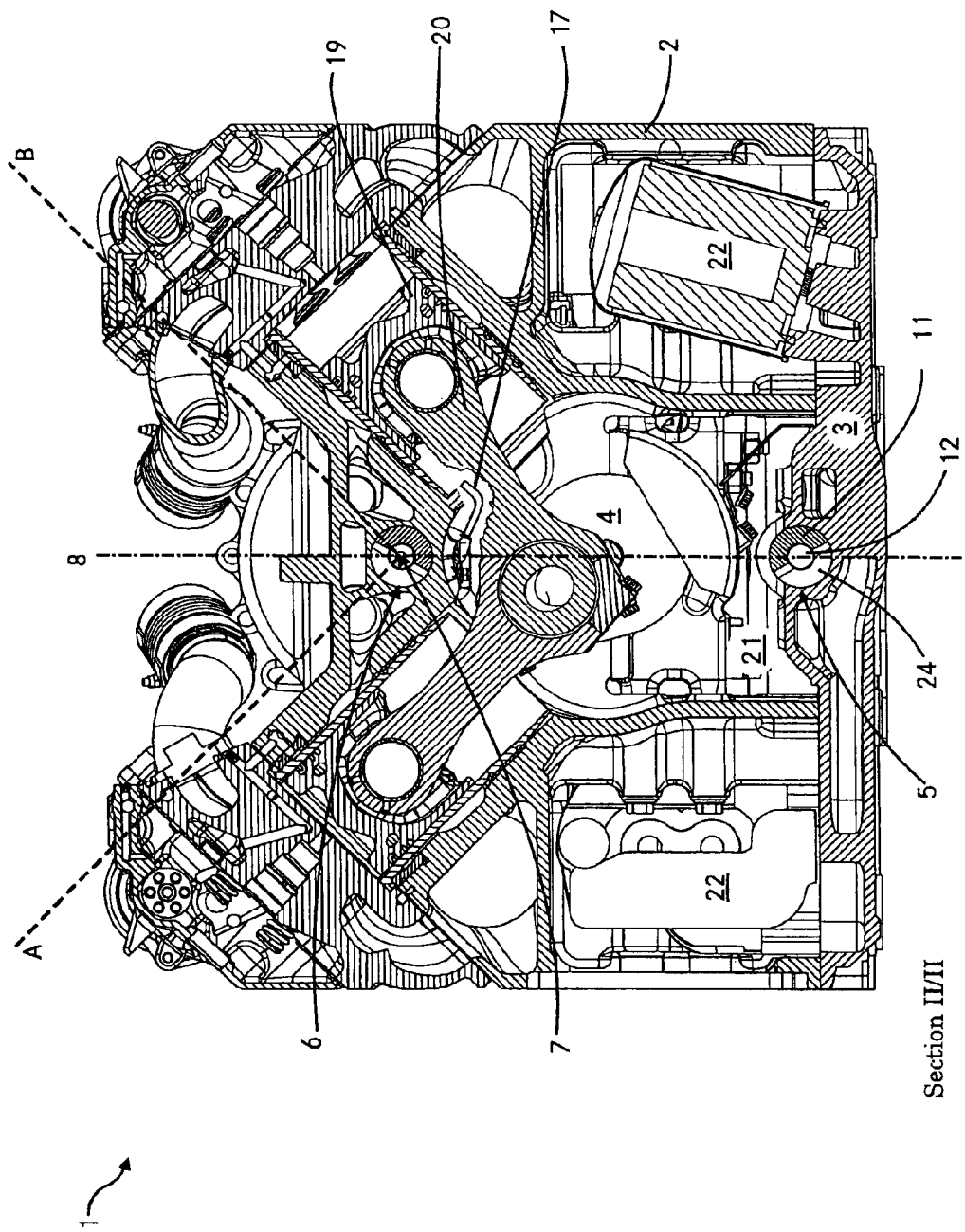
FIG. 2 is a sectional view along Line II/II. of Figure

FIG. 2 is a cross-sectional view of the internal-combustion engine 1 along Line II/II of FIG. 1. Such a cuboid-shaped crankcase 2 with interior chambers 22 and a corresponding crankshaft space 21 is known, for example, from German Patent Document DE 198 55 562 C1 (corresponding U.S. Pat. No. 6,253,725). Reference symbol A indicates a first line, and reference symbol B indicates a second line. These two lines correspond to the contour of the cylinder Vs. In the point of intersection 7 of the two lines A, B, the main lubricant duct 18 is arranged. The second balancing shaft 6 is situated inside this main lubricant duct 18. Reference number 8 indicates a perpendicular axis of symmetry, which leads through the intersection point 7. The axis of symmetry 8 is situated perpendicularly on the covering plate 3. The rotation center points of the first balancing shaft 5, of the crankshaft 4 and of the second balancing shaft 6 are situated on the axis of symmetry 8. In other words: The first balancing shaft 5 is situated directly below the crankshaft 4 and the second balancing shaft is situated exactly above the crankshaft 4. The representation of FIG. 2 again shows the construction of the two balancing shafts. Each balancing shaft has eccentric weights 11 which are created by partial milled-out sections 24 on the outer circumference. In the interior of the balancing shafts, one tube 12 respectively is provided for guiding the lubricant. The removal of the lubricant from the tube 12 takes place by way of radial bores.

A spraying nozzle 17 is illustrated for cooling a piston 19. The spraying nozzle 17 is supplied with lubricant from the second balancing shaft 6 by way of a feeding duct 14 (see FIG. 1). Viewed in the plane of the drawing, the spraying nozzle 17 is situated behind a connecting rod 20. For a better representation, the connecting rod 20 shows a corresponding torn opening in this area.

The preceding description indicates the following advantages for the invention:

Because of the geometrical position of the two balancing shafts, the free inertial forces of the second order are completely compensated; that is, a neutral balancing of moments is obtained;

the second balancing shaft is arranged in the main lubricant duct and takes over its function. No additional space is therefore required.

As a result of the tube provided in the second balancing shaft, in combination with the partial milled-out sections, splashing losses are avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Internal-combustion engine having four cylinders in a V-arrangement, having a crankshaft and having a first balancing shaft for reducing the free inertial forces of the second order which is arranged below and parallel to the crankshaft,
   wherein a second balancing shaft is provided in a point of intersection of the cylinder Vs above the crankshaft,
   wherein the rotation center points of the first balancing shaft, of the second balancing shaft and of the crankshaft are situated on a perpendicular axis of symmetry which extends through the point of intersection,
   wherein the second balancing shaft is arranged in a main lubricant duct for supplying main bearings of the crankshaft and spraying nozzles for the piston cooling with lubricant,
   wherein the second balancing shaft has a lubricant feeding device, a guiding duct, outlet openings and eccentric weights, and
   wherein the second balancing shaft has partial milled-out sections on the circumference, and a tube is arranged as a guiding duct in the interior.

2. Internal-combustion engine having four cylinders in a V-arrangement, having a crankshaft and having a first balancing shaft for reducing the free inertial forces of the second order which is arranged below and parallel to the crankshaft,
   wherein a second balancing shaft is provided in a point of intersection of the cylinder Vs above the crankshaft,
   wherein the rotation center points of the first balancing shaft, of the second balancing shaft and of the crankshaft are situated on a perpendicular axis symmetry which extends through the point of intersection, and
   wherein the first balancing shaft is disposed on a covering plate of the internal-combustion engine.

3. Internal-combustion engine having balancing shafts according to claim 2, wherein the first balancing shaft enclose a lubricant channel and has eccentric weights and outlet openings for feeding lubricant from the channel to bearings supporting the first balancing shaft.

4. Internal-combustion engine having balancing shafts according to claim 3, wherein the eccentric weights are formed by milled out sections on circumferential portions of the first balancing shaft.

5. Internal-combustion engine having four cylinders in a V-arrangement, having a crankshaft, having a first balancing shaft for reducing the free inertial forces of the second order which is arranged below and parallel to the crankshaft, and having a second balancing shaft above the crankshaft, the rotation center points of the first balancing, of the second balancing shaft and of the crankshaft being situated on a perpendicular axis of symmetry, wherein in the point of intersection of the cylinder Vs, a main lubricant duct is provided for supplying main bearings of the crankshaft as well as spraying nozzles for the piston cooling with lubricant, and the second balancing shaft is arranged within the main lubricant duct.

6. Internal-combustion engine having balancing shafts according to claim 5, wherein the second balancing shaft has a lubricant feeding device, a guiding duct, outlet openings and eccentric weights.

7. Internal-combustion engine having balancing shafts according to claim 6, wherein the second balancing shaft has partial milled-out sections on the circumference, and a tube is arranged as a guiding duct in the interior.

8. Internal-combustion engine having balancing shafts according to claim 5, wherein the first balancing shaft has a disposed on a covering plate of the internal-combustion engine.

9. Internal-combustion engine having balancing shafts according to claim 8, wherein the first balancing shaft has a lubricant feeding device, a guiding duct, outlet openings and eccentric weights.

10. Internal-combustion engine having balancing shafts according to claim 8, wherein first balancing shaft has partial milled-out sections on its circumference, and a tube is arranged an a guiding duct in the interior.

11. An internal-combustion engine comprising:
four cylinder arranged in a V-arrangement and having a point of intersection;
a crankshaft having main bearings and a rotation center point;
a first balancing shaft for reducing free inertial forces of the second order, the first balancing shaft having a rotation center point and being arranged below and parallel to the crankshaft;
a second balancing shaft arranged above the crankshaft and having a rotation center point, the rotation center points of the first balancing shaft, of the second balancing shaft and of the crankshaft being situated on a perpendicular axis of symmetry;
spraying nozzles for cooling pistons with lubricant; and
a main lubricant duct disposed at the point of intersection of the cylinder Vs for supplying the main bearings of the crankshaft and the spraying nozzles, wherein the second balancing shaft is arranged within the main lubricant duct.

12. The internal-combustion engine according to claim 11, wherein the second balancing shaft has a lubricant feeding device, a guiding duct, outlet openings and eccentric weights.

13. The internal-combustion engine according to claim 12, wherein the second balancing shaft has partial milled-out sections on its circumference, and a tube is arranged as a guiding duct in the interior.

14. The internal-combustion engine according to claim 11, wherein the first balancing shaft is disposed on a covering plate of the internal-combustion engine.

15. The internal-combustion engine according to claim 14, wherein the first balancing shaft has a lubricant feeding device, a guiding duct, outlet openings and eccentric weights.

16. The internal-combustion engine according to claim 14, wherein the first balancing shaft has partial milled-out sections on its circumference, and a tube is arranged as a guiding duct in the interior.

17. A balancing assembly for an internal-combustion engine including four cylinder arranged in a V-arrangement and having a point of intersection and a crankshaft having main bearings and a rotation center point, the balancing assembly comprising:
a first balancing shaft for reducing free inertial force of the second order, the first balancing shaft having a rotation center point and being arranged below and parallel to the crankshaft;
a second balancing shaft arranged above the crankshaft and having a rotation center point, the rotation center points of the first balancing shaft, of the second balancing shaft and of the crankshaft being situated on a perpendicular axis of symmetry;
spraying nozzles for cooling pistons with lubricant; and
a main lubricant duct disposed at the point of intersection of the cylinder Vs for supplying the main bearings of the crankshaft and the spraying nozzles, wherein the second balancing shaft is arranged within the main lubricant duct.

18. The balancing assembly according to claim 17, wherein the second balancing shaft has a lubricant feeding device, a guiding duct, outlet openings and eccentric weights.

19. The balancing assembly according to claim 18, wherein the second balancing shaft has partial milled-out sections on its circumference, and a tube is arranged as a guiding duct in the interior.

20. The balancing assembly according to claim 17, wherein the first balancing shaft is disposed on a covering plate of the internal-combustion engine.

21. The balancing assembly according to claim 20, wherein the first balancing shaft has a lubricant feeding device, a guiding duct, outlet openings and eccentric weight.

22. The balancing assembly according to claim 20, wherein the first balancing shaft has partial milled-out sections on its circumference, and a tube is arranged as a guiding duct in the interior.

* * * * *